(12) United States Patent
Kondapalli

(10) Patent No.: US 7,730,230 B1
(45) Date of Patent: Jun. 1, 2010

(54) FLOATING FRAME TIMING CIRCUITS FOR NETWORK DEVICES

(75) Inventor: Raghu Kondapalli, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 152 days.

(21) Appl. No.: 12/002,029

(22) Filed: Dec. 14, 2007

Related U.S. Application Data

(60) Provisional application No. 60/882,767, filed on Dec. 29, 2006.

(51) Int. Cl.
*G06F 3/00* (2006.01)
*G06F 15/173* (2006.01)

(52) U.S. Cl. .............................. 710/15; 710/16; 710/17; 710/18; 710/19; 710/29; 710/30; 709/224

(58) Field of Classification Search ........................ None
See application file for complete search history.

(56) References Cited

U.S. PATENT DOCUMENTS

| | | | |
|---|---|---|---|
| 7,454,425 B2* | 11/2008 | Che et al. ...................... | 707/10 |
| 2007/0011343 A1* | 1/2007 | Davis et al. .................. | 709/231 |

OTHER PUBLICATIONS

U.S. Appl. No. 10/829,866, filed Apr. 21, 2004; "Method and Apparatus for Managing Packets in a Packet Switched Network"; Tsahi Daniel et al.; 77 pages.

U.S. Appl. No. 11/254,588, filed Oct. 20, 2005; "Inter-Device Flow Control"; Donald Pannell et al.; 54 pages.

IEEE P802.1Qat/D1.0; Draft Standard for Local and Metropolitan Area Networkss- Virtual Bridged Local Area Networks—Amendment 9: Stream Reservation Protocol (SRP); Sponsor LAN/MAN Standards Committee of the IEEE Computer Society; Prepared by the Audio/Video Bridging Task Group of IEEE 802.1; 42 pages; Jan. 17, 2008; IEEE P802.1Qat—Stream Reservation Protocol; pp. 1-3.

IEEE P802.1AS/D2.0; Draft Standard for Local and Metropolitan Area Networks- Timing and Synchronization for Time-Sensitive Applications in Bridged Local Area Networks; Sponsor LAN/MAN Standards Committee of the IEEE Computer Society; Prepared by the Interworking Task Group of IEEE 802.1; 204 pages; Feb. 22, 2008; IEEE 802.1AS—Timing and Synchronization; pp. 1-6.

International Standard IEC 61588(E):2004; First Edition Sep. 2004; IEEE 1588(E)TM 2002; Precision Clock Synchronization Protocol for Network Measurement and Control Systems; Sponsor TC9—Technical Committee on Sensor Technology of the IEEE Instrumentation and Measurement Society; Approved Sep. 12, 2002; IEEE-SA Standards Board; 158 pages.

IEEE Std 1394-1995; IEEE Standard for a High Performance Serial Bus; Sponsor Microprocessor and Microcomputer Standards Committee of the IEEE Computer Society; Approved Dec. 12, 1995; IEEE Standards Board; Approved Jul. 22, 1996; American National Standards Institute; 392 pages.

* cited by examiner

*Primary Examiner*—Alan Chen

(57) ABSTRACT

Apparatus having corresponding methods and computer programs comprise a plurality of interfaces to pass control frames; a memory to store configuration information; a select circuit to select one of the interfaces according to the configuration information; and a timing circuit to determine a time of passage of each control frame passing through the selected one of the interfaces.

14 Claims, 6 Drawing Sheets

FLOATING FRAME TIMING CIRCUITS FOR NETWORK DEVICES

CROSS-REFERENCE TO RELATED APPLICATIONS

This application claims the benefit of U.S. Provisional Patent Application Ser. No. 60/882,767, filed on Dec. 29, 2006, the disclosure thereof incorporated by reference herein in its entirety.

BACKGROUND

The present disclosure relates generally to data communications. More particularly, the present disclosure relates to floating frame timing circuits for network devices.

Various protocols defined by standards bodies like IEEE allow end stations to exchange timing information across various nodes within a network of devices. This timing information can include providing a consistent time of day for all nodes, accurate clock synchronization mechanisms, and the like.

Conventional Ethernet as defined by the IEEE 802 standards body is asynchronous in nature, that is, end stations don't employ a common time base or even a concept of time. However, several applications exist that could benefit from isochronous Ethernet communications, for example media streaming applications like Internet Protocol Television (IPTV), high-definition audio and video consumer appliance traffic, and the like.

To enable such applications, the IEEE 802.1 standards body is developing a new standard to accommodate exchange of timing and synchronization information with respect to stations or nodes connected via Ethernet. To accommodate isochronous operation, the new IEEE 802.1AS standard under development specifies the use of a Precision Time Protocol (PTP), an industrial automation standard (IEEE 1588), in conjunction with existing Ethernet protocols.

To attain the timing accuracy required by PTP, measurements of frame arrival and departure times are preferably made using hardware timing circuits. However, because network devices currently provide multiple ports, multiple interfaces per port, or both, the number of timing circuits needed to obtain these measurements for each interface can be large, thereby increasing the cost and complexity of the devices.

SUMMARY

In general, in one aspect, an embodiment features an apparatus comprising: a plurality of interfaces to pass control frames; a memory to store configuration information; a select circuit to select one of the interfaces according to the configuration information; and a timing circuit to determine a time of passage of each control frame passing through the selected one of the interfaces.

Embodiments of the apparatus can include one or more of the following features. In some embodiments, each time of passage indicates a time of arrival of the control frame into the selected one of the interfaces and/or a time of departure of the control frame from the selected one of the interfaces. Some embodiments comprise a processor to compute at least one of offset values, correction times, and residence times based on the time of passage of the respective control frame. In some embodiments, the apparatus generates a response frame for each control frame based on at least one of the respective offset values, correction times, and residence times. Some embodiments comprise a port comprising the interfaces. Some embodiments comprise a plurality of ports each comprising one of the interfaces. In some embodiments, each control frame comprises a Precision Time Protocol (PTP) frame compliant with all or part of IEEE standard 1588 and/or 802.1AS. In some embodiments, each of the interfaces is selected from a group consisting of: a physical-layer device (PHY) interface; a media access control (MAC) interface; a gigabit media independent (GMII) interface; and a serializer/deserializer (SERDES) interface. Some embodiments comprise a network device comprising the apparatus. In some embodiments, the network device is selected from the group consisting of: a network switch; a router; and a network interface controller.

In general, in one aspect, an embodiment features a method comprising: passing control frames through a plurality of interfaces; storing configuration information; selecting one of the interfaces according to the configuration information; and determining a time of passage of each control frame passing through the selected one of the interfaces.

Embodiments of the method can include one or more of the following features. In some embodiments, each time of passage indicates a time of arrival of the control frame into the selected one of the interfaces and/or a time of departure of the control frame from the selected one of the interfaces. Some embodiments comprise computing at least one of offset values, correction times, and residence times based on the time of passage of the respective control frame. Some embodiments comprise generating a response frame for each control frame based on at least one of the respective offset values, correction times, and residence times. In some embodiments, each control frame comprises a Precision Time Protocol (PTP) frame compliant with all or part of IEEE standard 1588 and/or 802.1AS. In some embodiments, each of the interfaces is selected from a group consisting of: a physical-layer device (PHY) interface; a media access control (MAC) interface; a gigabit media independent (GMII) interface; and a serializer/deserializer (SERDES) interface.

In general, in one aspect, an embodiment features an apparatus comprising: a plurality of interface means for passing control frames; memory means for storing configuration information; select means for selecting one of the interface means according to the configuration information; and timing means for determining a time of passage of each control frame passing through the selected one of the interface means.

Embodiments of the apparatus can include one or more of the following features. In some embodiments, each time of passage indicates a time of arrival of the control frame into the selected one of the interface means or a time of departure of the control frame from the selected one of the interface means. Some embodiments comprise processor means for computing at least one of offset values, correction times, and residence times based on the time of passage of the respective control frame. Some embodiments comprise means for generating a response frame for each control frame based on at least one of the respective offset values, correction times, and residence times. Some embodiments comprise port means for communicating comprising the interface means. Some embodiments comprise a plurality of port means for communicating each comprising one of the interface means. In some embodiments, each control frame comprises a Precision Time Protocol (PTP) frame compliant with all or part of IEEE standard 1588 and/or 802.1AS. Some embodiments comprise a network device comprising the apparatus. In some embodiments, the network device is selected from the group consisting of: a network switch; a router; and a network interface controller.

In general, in one aspect, an embodiment features a computer program executable on a processor, the computer program comprising: instructions for storing configuration information for a plurality of interfaces passing control frames; instructions for selecting one of the interfaces according to the configuration information; and instructions for determining a time of passage of each control frame passing through the selected one of the interfaces.

Embodiments of the computer program can include one or more of the following features. In some embodiments, each time of passage indicates a time of arrival of the control frame into the selected one of the interfaces or a time of departure of the control frame from the selected one of the interfaces. Some embodiments comprise instructions for computing at least one of offset values, correction times, and residence times based on the time of passage of the respective control frame. Some embodiments comprise instructions for generating a response frame for each control frame based on at least one of the respective offset values, correction times, and residence times.

In some embodiments, each control frame comprises a Precision Time Protocol (PTP) frame compliant with all or part of IEEE standard 1588 and/or 802.1AS. In some embodiments, each of the interfaces is selected from a group consisting of: a physical-layer device (PHY) interface; a media access control (MAC) interface; a gigabit media independent (GMII) interface; and a serializer/deserializer (SERDES) interface.

The details of one or more implementations are set forth in the accompanying drawings and the description below. Other features will be apparent from the description and drawings, and from the claims.

Figure 1:
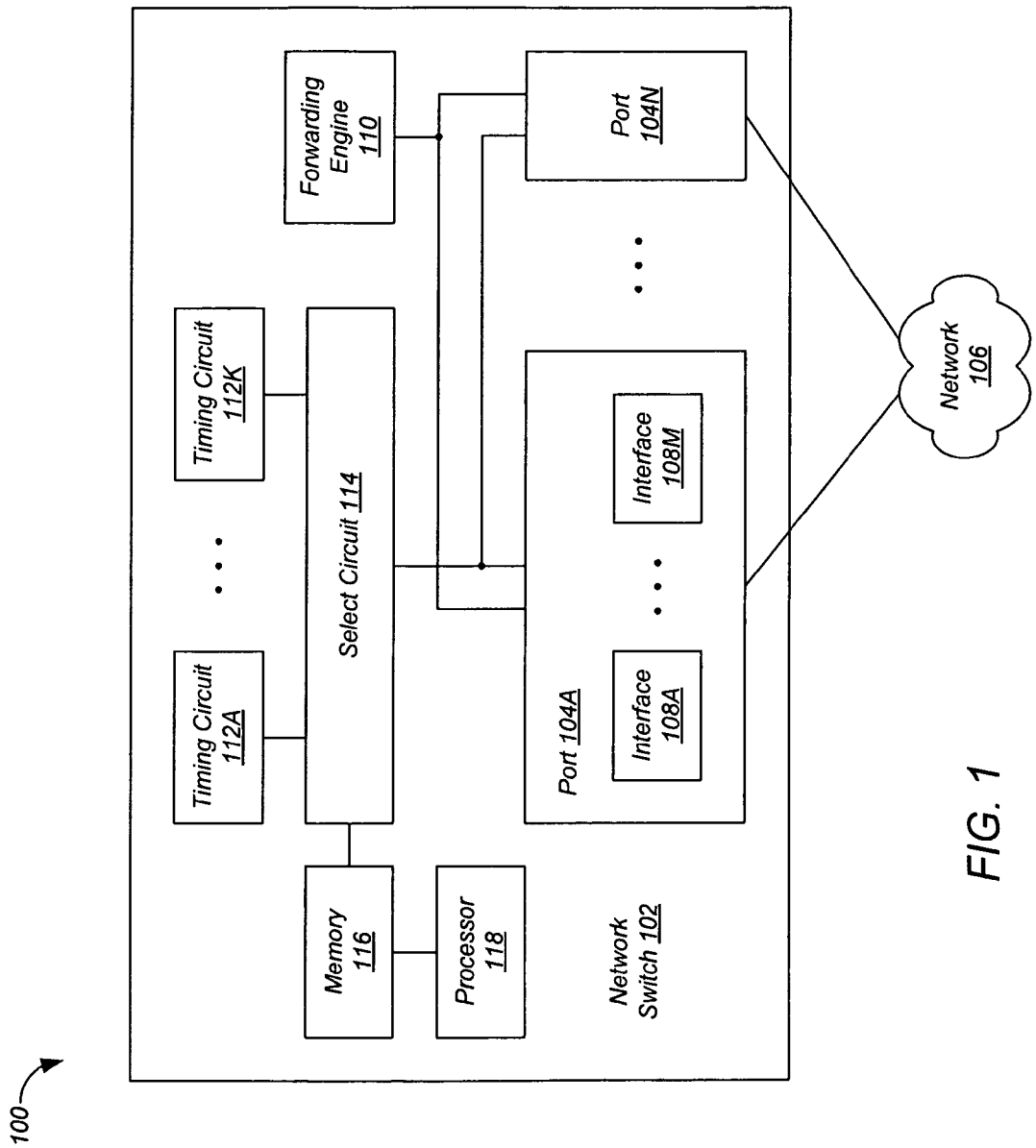
FIG. 1 shows a data communication system comprising a network switch in communication with an Ethernet network according to some embodiments.

The leading digit(s) of each reference numeral used in this specification indicates the number of the drawing in which the reference numeral first appears.

DETAILED DESCRIPTION

Embodiments described herein provide "floating" frame timing circuits for network devices. The timing circuits are "floating" in that a timing circuit in a network device is not dedicated to a single port or interface, but instead can be shared by a plurality of interfaces and/or ports, thereby reducing the number of timing circuits needed for the network device.

Situations exist where the number of timing circuits in a network device can be reduced. For example, timing circuits are not required for CPU ports in a network device under the PTP standard because the interval beginning with transmission of a frame from a CPU port to the CPU, and ending with reception of the frame into the CPU port from the CPU, is already included in the "residence time" of the frame within the switch as defined by the PTP standards. So, for example, in a six-port switch where one of the ports will be configured as a CPU port, only five timing circuits are required. As another example, when a port includes multiple interfaces, only one timing circuit is required for the port because the port can use only one interface at a time.

FIG. 1 shows a data communication system 100 comprising a network switch 102 in communication with an Ethernet network 106 according to some embodiments. In other embodiments, other sorts of network devices can replace network switch 102, such as routers, network interface controllers, and the like, and Ethernet network 106 can be replaced with other sorts of networks.

Although in the described embodiments, the elements of network device 102 are presented in one arrangement, other embodiments may feature other arrangements, as will be apparent to one skilled in the relevant arts based on the disclosure and teachings provided herein. For example, the elements of network device 102 can be implemented in hardware, software, or combinations thereof.

Referring to FIG. 1, network switch 102 includes one or more ports 104A-N to exchange frames of data with network 106. In some embodiments, one or more of ports 104 can be configured as a CPU port. Network switch 102 can also include a forwarding engine 110 to transfer frames of data among ports 104.

Each network port 102 includes one or more network interfaces 108A-M to pass the frames (that is, to receive and/or transmit the frames). The frames can include control frames such as Precision Time Protocol (PTP) frames compliant with all or part of IEEE standard 1588 and/or 802.1AS. Interfaces 108 can include interfaces such as physical-layer device (PHY) interfaces, media access control (MAC) interfaces, gigabit media independent (GMII) interfaces, serializer/deserializer (SERDES) interfaces, variations of those interfaces, and the like.

Network switch 102 also includes a memory 116 to store configuration information, one or more timing circuits 112A-K, and a select circuit 114 to select an interface 108 for each timing circuit 112 according to the configuration information. The configuration information can be supplied by the manufacturer of network switch 102, by a customer after delivery of network switch 102, and the like. Network switch 102 can also include a processor 118 to execute the software layer described below.

Each timing circuit 112 determines a time of passage of each control frame passing through the interface 108 selected for that timing circuit 112. Each time of passage indicates a time of arrival of a control frame into the selected interface 108 or a time of departure of a control frame from the selected interface 108. Each timing circuit 112 can be implemented to measure arrival times, departure times, or both.

In order to support the IEEE 802.1AS standard, a switching device generally decodes EtherType and Sub-type fields from a frame (or "packet") and recognizes certain special Precision Time Protocol (PTP) messages ("control frames") which are to be forwarded to a central processing unit (CPU). According to the standard, a switching device generally timestamps such 802.1AS control frames both upon arrival into, and upon departure from, a given node.

PTP relies upon six relevant control frames which get communicated among the various nodes to facilitate synchronization and clock adjustment: Sync; Follow-up; PDelay_Req; PDelay_Resp; PDelay_Resp_Followup; and Announce frames. By way of background, several of these control frames are discussed below; it is noted, however, that the present disclosure is not intended to be limited to PTP or to any other particular isochronous protocol. As set forth below, for example, the disclosed timestamping and synchronization techniques also have utility in conjunction with, among other protocols and procedures, the High-Performance Serial Bus standard (IEEE 1394) and Stream Registration Protocol (SRP) (IEEE 802.1Qat).

In a given audio/video bridging (AVB) network domain, a particular node is generally selected as a "grand master" for timing and synchronization purposes. Typically, the grand master is selected, of all the available AVB nodes, using a Best Master Clock (BMC) selection algorithm, i.e., a node gets selected as the grand master because it is determined to employ the most appropriate clocking mechanisms (the BMC) in accordance with predetermined criteria specified in the relevant standard. As is generally known, e.g., in PTP and other isochronous systems, a master and slave clock may synchronize by exchanging timing messages. In some implementations, the grand master generates Sync messages to all the slave nodes (i.e., one grand master node sends a single Sync control frame to address every networked slave node). In accordance with several of the IEEE 802.1 standards, each Sync frame is terminated in the receiving AVB node, processed or otherwise modified (e.g., by a PTP or other applicable software layer), and forwarded to other ports on a given bridge. Thus, each slave AVB node receives a Sync frame, processes it, and sends a modified Sync frame to other Slave AVB nodes. In the foregoing manner, the grand master may employ a single Sync frame to apprise the various slave nodes regarding timing information associated with the BMC. The exact timing information regarding when the Sync frame was transmitted from the hardware of the grand master node is subsequently transmitted to the slaves (again, from the grand master) in a separate control frame generally referred to as a Follow-up message.

Generally, the PDelay_Req and PDelay_Resp control frames serve two purposes: they allow slave AVB nodes to communicate their respective time information to the grand master; and they enable link partners to determine the distance between each other. Each slave node sends a PDelay_Req message to communicate its timing information to the grand master. Upon receipt of the PDelay_Req control frame, the grand master node transmits a PDelay_Resp frame to the slave when the original PDelay_Req message arrives at the hardware level.

With respect to control frames in the various IEEE standards, it is generally desirable that the hardware layer of a switching device generate precise timestamp information, upon both receipt and transmission, to improve the accuracy of offset calculations as described below.

Figure 2:
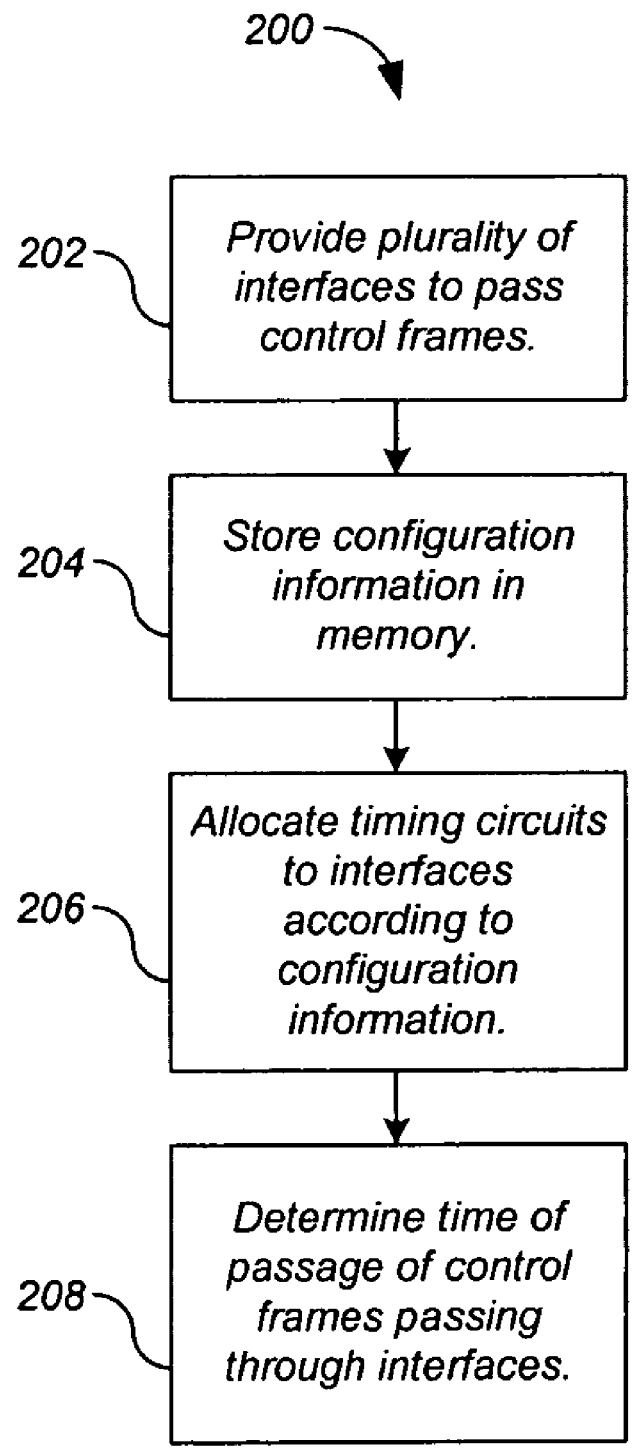
FIG. 2 shows a process for the network switch of FIG. 1 according to some embodiments.

FIG. 2 shows a process 200 for network switch 102 of FIG. 1 according to a some embodiments. Although in the described embodiments, the elements of process 200 are presented in one arrangement, other embodiments may feature other arrangements, as will be apparent to one skilled in the relevant arts based on the disclosure and teachings provided herein. For example, in various embodiments, some or all of the steps of process 200 can be executed in a different order, concurrently, and the like.

Process 200 provides a plurality of interfaces 108 to pass control frames (step 202). For example, process 200 can provide a plurality of ports 104 each having one interface 108, a single port 104 having multiple interfaces 108, or any combination thereof. The control frames can include PTP frames compliant with all or part of IEEE standard 1588 and/or 802.1AS.

Process 200 also stores configuration information in memory 116 (step 204). The configuration information specifies the allocation of timing circuits 112 to interfaces 108. The configuration information can also specify the port 104 to be used as a CPU port, and the like.

Table 1 shows example configurations for port 4 of a six-port network switch 102 having six timing circuits 112 according to some embodiments.

TABLE 1

| CPUDEST | P4_MODE | PTP4 allocation | PTP5 allocation |
|---|---|---|---|
| 0, 1, 2 or 3 | 0x0, 0x1, 0x2, 0x3 | GMII4 | MAC5 |
| 0, 1, 2 or 3 | 0x4 | PHY4 | MAC5 |
| 0, 1, 2 or 3 | 0x5, 0x6, 0x7 | SERDES4 | MAC5 |
| 4 | 0x0, 0x1, 0x2, 0x3 | PHY4 | MAC5 |
| 4 | 0x4 | SERDES4 | MAC5 |
| 4 | 0x5, 0x6, 0x7 | PHY4 | MAC5 |
| 5 | 0x0, 0x1, 0x2, 0x3 | GMII4 | PHY4 |
| 5 | 0x4 | PHY4 | SERDES4 |
| 5 | 0x5, 0x6, 0x7 | SERDES4 | PHY4 |

In Table 1, the CPUDEST column indicates to which port 104 a CPU is connected. The six ports 104 are numbered 0-5. The P4_MODE indicates a configuration value that specifies the allocation of timing circuits 112 to interfaces 108. The six timing circuits 112 are numbered PTP0-PTP5. The interfaces 112 to which PTP4 and PTP5 can be allocated are the GMII, PHY, and SERDES interfaces of port 4 (shown in Table 1 as GMII4, PHY4, and SERDES4) and the MAC interface of port 5 (shown in Table 1 as MAC5). Of course, Table 1 represents only one set of possible configuration options.

Process 200 allocates timing circuits 112 to interfaces 108 according to the configuration information stored in memory 116 (step 206). For example, select circuit 114 selects a timing circuit 112 for an interface 108 according to the configuration information, and connects the selected timing circuit 112 to the interface 108.

Each timing circuit 112 then determines a time of passage of each control frame passing through the interface 108 selected for that timing circuit 112 (step 208). Each time of passage can indicate a time of arrival of the control frame into the selected interface 108, or a time of departure of the control frame from the selected interface 108. In some embodiments, each timing circuit 112 can determine arrival times, departure times, or both. This timestamp information can be used to accommodate isochronous network operation, for example as specified in the PTP standards.

In some embodiments, embedding timestamp information into a control frame may efficiently transmit timestamp information to a software layer resident at a switching device. As noted above, various protocols such as PTP and SRP, among others, define mechanisms to synchronize two end stations, i.e., nodes, terminals, or other devices operating in a networked environment. The accuracy of synchronization between the end stations generally depends, among other factors, upon: how frequently the control frames applicable to the standard are exchanged between end stations; the accuracy of timestamps associated with those control frames; and how rapidly timestamp information may be transmitted to the software layer.

The more frequently the control frames are exchanged between the grand master node and slave nodes, the higher the accuracy of synchronization. The higher the accuracy of the synchronization between the grand master and the slaves, the more readily PTP, SRP, and other isochronous systems may handle applications that require precise timing across various nodes.

Typical implementations of PTP logic capture timestamps in hardware and pass along those timestamps to the PTP software layer for processing. The timing of these events is generally as follows. Hardware logic receives a PTP control frame that needs to be timestamped. The hardware logic timestamps the PTP control frame and stores the timestamp value in registers (e.g., flip-flops). The hardware notifies the PTP software layer regarding the status of the timestamp registers. Additionally, the hardware forwards the complete (unmodified) PTP control frame to the PTP software layer. The PTP software layer receives the timestamp indication from the hardware and reads the timestamp registers from hardware; the PTP software also receives the unmodified PTP control frame from the hardware layer. Upon receiving the appropriate information, suitable PTP control software computes frequency and phase offsets between the master node and the slave node using the PTP timestamp information and various information fields within the control frame.

Again, while the following disclosure specifically addresses Ethernet based switching implementations, those of skill in the art will appreciate that a system and method of embedding timestamps into a control frame also have utility in other end point implementations such as in conjunction with audio/video (AV) servers, AV clients, and the like.

To increase the accuracy of time synchronization between a grand master and various slave nodes, it is desirable that the software layer receive control frame timestamp information as soon as possible following receipt of the control frame from the hardware layer; in some instances, it may be desirable that the software layer receive timestamp information simultaneously or concomitantly with the control frame itself. As noted above, transmission of such timestamp information to software is generally implementation specific, i.e., it is not specified by any particular communications protocol standard such as IEEE 802.1AS or IEEE 1394.

To eliminate or otherwise to minimize the delay between receipt (in the software layer) of a control frame and its associated timestamp information, the disclosed system and method embed timestamp information into the control frames that get forwarded from the hardware layer to the software layer, i.e., the timestamp information may be embedded into a control frame before the control frame is forwarded to the software layer. In the foregoing manner, the software layer may receive the control frame along with its associated timestamp information substantially simultaneously.

In some embodiments, a system and method of embedding timestamp information into a control frame may employ aspects of Distributed Switching Architecture (DSA) technology. In general, DSA-enabled switching devices may employ a tag mechanism that allows communication between a switch and a CPU. Additional information regarding DSA technology may be found in the following United States patent applications, the disclosures of which are incorporated herein by reference: Ser. No. 10/829,866, filed Apr. 21, 2004, entitled "Method and Apparatus for Managing Packets In a Packet Switched Network;" and Ser. No. 11/254,588, filed Oct. 20, 2005, entitled "Inter-Device Flow Control." In accordance with the present disclosure, the base DSA tagging scheme may be modified to create a special message type for passing along PTP (or other protocol) timestamp information from the hardware layer to the software layer.

Figure 3:
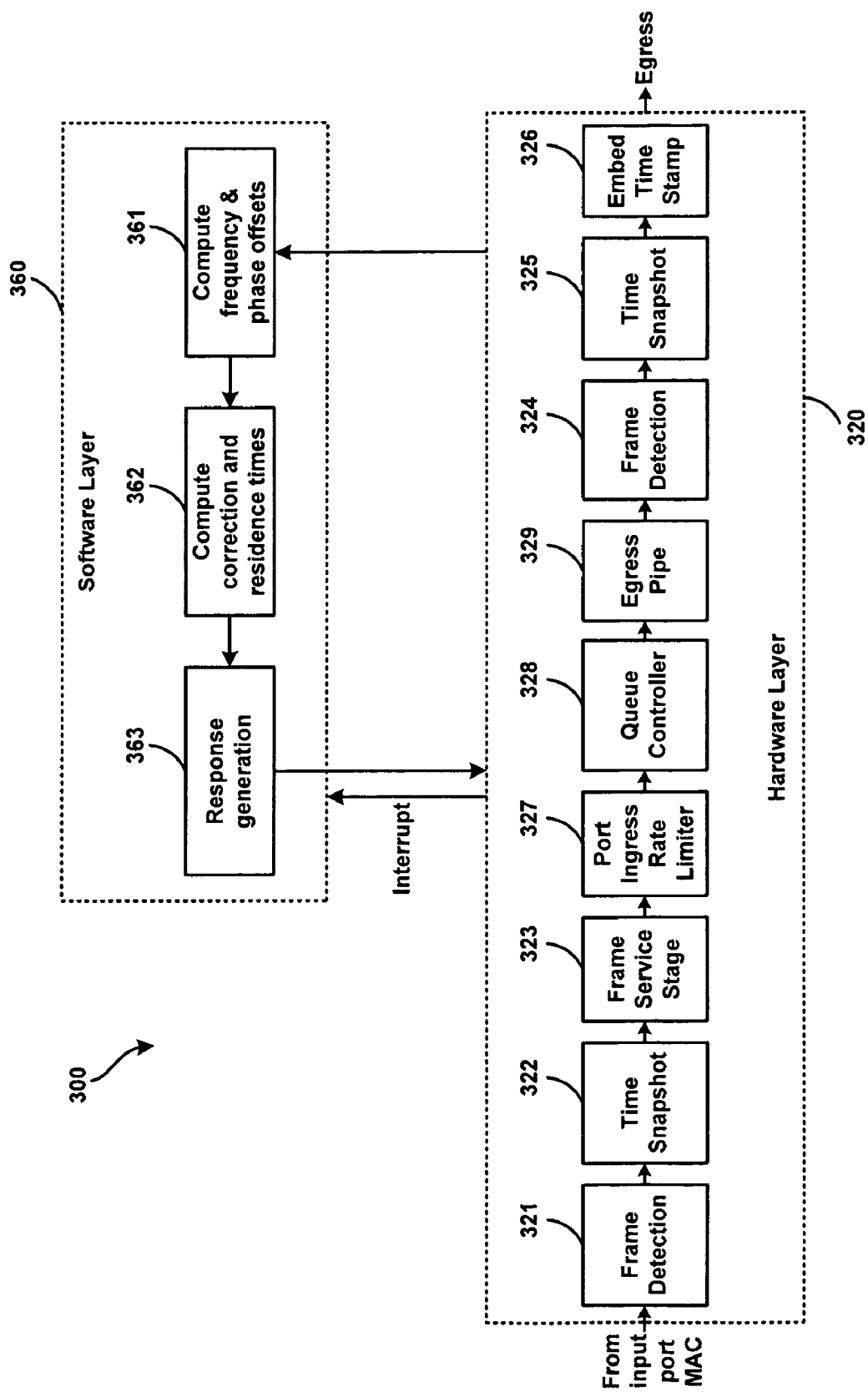
FIG. 3 is a simplified block diagram illustrating elements of one embodiment of a switching device.

FIG. 3 is a simplified block diagram illustrating elements of one embodiment of a switching device. As noted above, switching device 300 generally comprises a hardware layer 320 and a software layer 360.

On the ingress side of hardware layer 320, an ingressing frame received, for instance, from an input port media access controller (MAC) may be detected by frame detection logic 321. Frame detection may be facilitated by the EtherType of the frame, for example, or by other fields in the frame tag as set forth below. A time snapshot may be acquired at time snapshot logic 322. This time snapshot may be implemented using Frame CheckSequence checking methodologies (e.g., Rx MAC) or using glue logic between the MAC and physical (PHY) layers. Frame service logic 323 may determine whether a frame is a PTP or SRP control frame, for example, and trap such frames to a CPU port for additional processing. Whereas forward frames may be handled exclusively by hardware layer 320, an interrupt may be generated, as indicated in FIG. 3, when a control frame is identified for processing by software layer 360.

In operation, queue controller 328 may apply or embed timestamp information (if required, e.g., responsive to a determination made by frame service logic 323) to specified control frames. By way of example, timestamp information may be embedded in a MAC client data field (as described below) prior to forwarding a control frame to software layer 360. Aside from this timestamp embedding functionality, port ingress rate limiter 327, queue controller 328, and egress pipe 329 may generally operate in accordance with known hardware switching techniques.

Upon receipt of control frames at software layer 360, embedded timestamp information may be employed by a computational module 361 appropriately configured to compute frequency and phase offset values necessary or desired for synchronization with the BMC at the grand master node. These offset values may be employed by an additional computational module 362 appropriately configured to compute correction and residence times associated with each processed control frame, for example as described in the IEEE 802.1AS standard and the IEEE 1588 standard, the contents thereof incorporated herein by reference in their entirety. Given offset values, correction times, and residence times (which may be approximated), a response generation module 363 may generate an appropriate "response" control frame (or packet) to be transmitted from switching device 300. In the foregoing manner, software layer 360 may be operative to generate a control frame (e.g., a PDelay_Req frame) that is expected or required by a particular communication protocol responsive to the nature of the control frame originally received at frame detection logic 321 and identified by frame service logic 323 as requiring timestamping.

On the egress side of hardware layer 320, additional frame detection logic 324 and time snapshot logic 325 may operate substantially as set forth above with reference to the ingress side. Frame detection logic 324 may utilize the EtherType or other fields in the frame to identify the type of frame being handled. Time snapshot logic 325 may implement Rx MAC or other methodologies to determine a transmit time for each respective control frame processed for egress. Timestamp logic 326 may stamp a control frame upon egress from switching device 300 as is generally known in the art.

It will be appreciated that the various elements depicted in FIG. 3 may be combined or interrelated in numerous ways, and that the illustrated embodiment is susceptible of many variations. For example, the functionality of computational modules 361 and 362 may be combined into a single module, and may also be integrated with creation of a response frame at response generation module 363. Elements are depicted as discrete components in hardware layer 320 for clarity only; those of skill in the art will appreciate that many of elements 321-326 may also be combined or integrated in accordance with operational requirements or functional characteristics of a switching device 300. In some implementations, for example, frame service logic 323 (rather than queue controller 328) may embed timestamp information for a particular control frame. It will be appreciated that frame detection logic 321, time snapshot logic 322, and frame service logic 323 may be configured to interoperate or otherwise to cooperate with respect to ingress frame processing. By way of example, capture time generation procedures may be initiated when a frame ingresses from a PHY layer; this frame may be timestamped (if identified as a control frame, for instance), and timestamp counters may be updated based upon the timestamp. Such timestamp counters may be maintained in a suitably configured memory structure such as a first in-first out (FIFO) buffer, for example. Appropriate hardware interrupts may be generated to trap identified control frames to a CPU port. Where some or all of the foregoing operational characteristics may be integrated into a single hardware element, components 321-323 may not be embodied as discrete logic elements, but rather their respective functionalities may be combined into a single circuit or integrated functional block.

Figure 4:
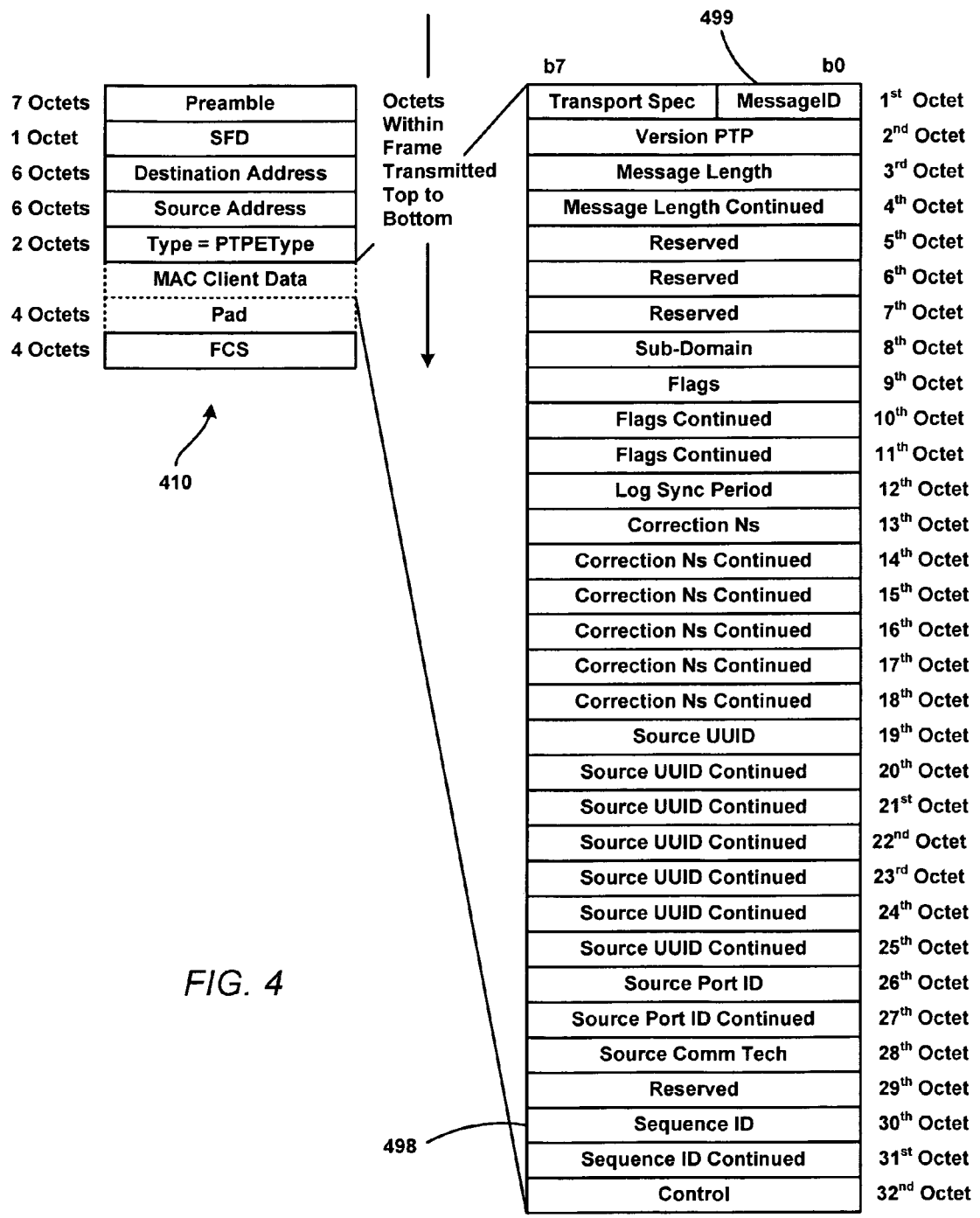
FIG. 4 is a simplified block diagram illustrating one embodiment of a Precision Time Protocol frame facilitating isochronous network communications.

FIG. 4 is a simplified block diagram illustrating a Precision Time Protocol frame facilitating isochronous network communications, for example as described in the IEEE 802.1AS standard and the IEEE 1588 standard. A PTP frame is generally indicated at reference numeral 410. Frame 410 includes various data fields, including, but not limited to: a preamble; a start-of-frame delimiter (SFD); a destination address; a source address; an EtherType indicator (in the figure, the frame type is a PTP EtherType); a MAC client data indicator; an optional data pad (e.g., for use in the event that frame 410 does not meet the minimum frame size as defined in Ethernet); and a Frame CheckSequence field (FCS). The MAC client data field is illustrated as exploded on the right side of FIG. 4.

In accordance with the FIG. 4 embodiment, frame 410 includes Message ID bits 499 in the $1^{st}$ octet, and Sequence ID bits 498 in the $30^{th}$ octet, of the MAC client data field. Message ID bits 499 generally may specify a particular type of PTP frame, i.e., Sync/Followup, PDelay, etc. Depending upon the message type (i.e., the value in the Message ID bits 499), a determination may be made whether the frame must be timestamped. Sequence ID bits 498 in general associate a particular PTP frame 410 with a particular timestamp. This facilitates correlation between frame 410 and its timestamp in software layer 360.

Figure 5:
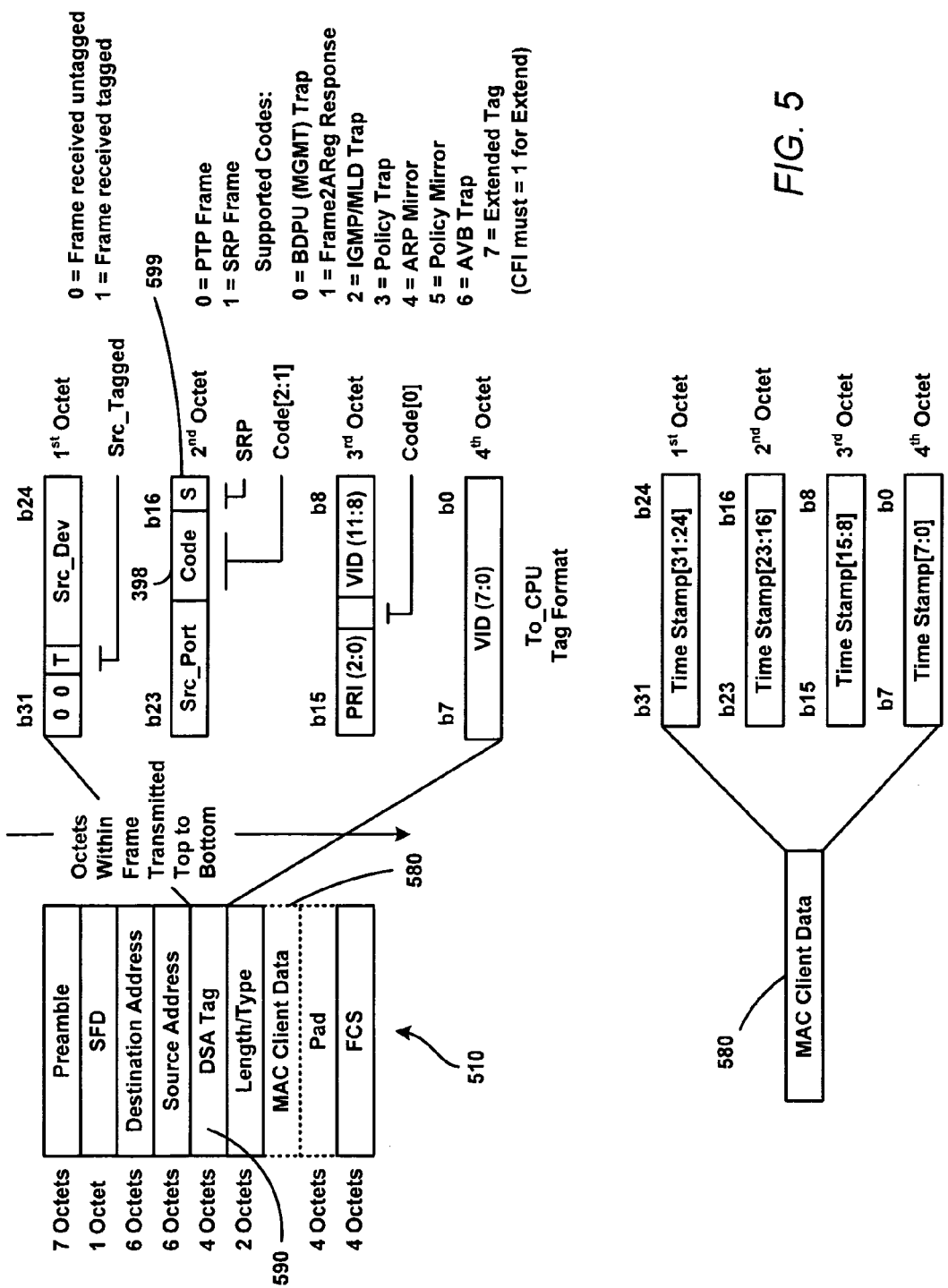
FIG. 5 is a simplified block diagram illustrating one embodiment of a Distributed Switching Architecture frame facilitating isochronous network communications.

FIG. 5 is a simplified block diagram illustrating one embodiment of a Distributed Switching Architecture frame facilitating isochronous network communications. A frame is generally indicated at reference numeral 510. DSA tagged frame 510 includes various data fields, including, but not limited to: a preamble; a start-of-frame delimiter (SFD); a destination address; a source address; a length and EtherType indicator (Length/Type); a MAC client data indicator; an optional data pad (e.g., for use in the event that frame 510 does not meet the minimum frame size as defined in Ethernet); and a frame CheckSequence field (FCS). Additionally, frame 510 includes a DSA Tag 590 that is illustrated as exploded on the right side of FIG. 5.

In accordance with the FIG. 5 embodiment, the standard DSA tag format has been modified to include a bit 599 in the $2^{nd}$ octet of DSA Tag 590 that specifies whether frame 510 is a PTP frame or an SRP tag; i.e., when bit 599 is 0, frame 510 is identified as a PTP frame, and when bit 599 is 1, frame 510 is identified as an SRP frame. Code bits 598 specify policy to be executed with respect to frame 510.

A MAC client data field 580 is illustrated as exploded at the bottom of FIG. 5. When bits 599 indicate that frame 510 is a PTP control frame, timestamp information may be embedded in the $1^{st}$ through the $4^{th}$ octets of MAC client data field 580 as indicated. Similarly, these octets may include timestamp information for SRP frames or other types of frames supporting isochronous communication protocols. The remaining data associated with frame 510 may follow the $4^{th}$ octet in MAC client data field 580.

Figure 6:
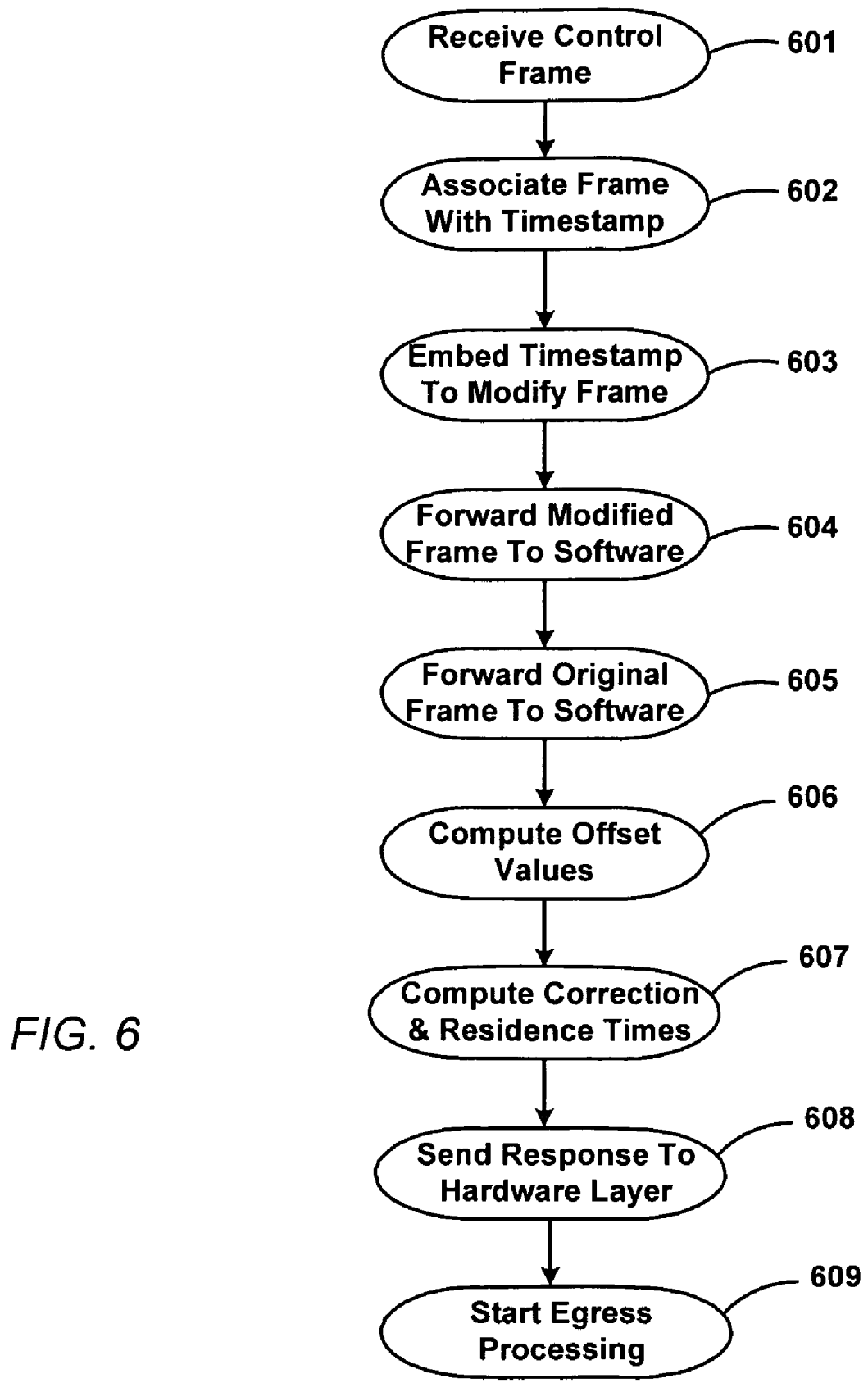
FIG. 6 is a simplified diagram illustrating the operation of one embodiment of a method of handling a control frame at a switching device.

FIG. 6 is a simplified diagram illustrating the operation of one embodiment of a method of handling a control frame at a switching device. Hardware logic (such as indicated by reference numeral 320 in FIG. 3) at a switching device may receive (block 601) a control frame to be timestamped; as set forth above, such control frames may be embodied in or comprise timing and synchronization related messages supported by PTP, SRP, or various other isochronous protocols. As noted above with reference to FIG. 3, an EtherType field or other data associated with a frame may identify a particular frame as a control frame and enable hardware logic to make a frame service determination regarding any additional processing that may be required or desired in accordance with the type of frame received as specified by the applicable communications protocol. It will be appreciated that, upon recognition of a PTP, SRP, or other control frame requiring a timestamp in accordance with the appropriate protocol, a hardware interrupt or other flag signal may be generated to trap the control frame to a CPU for forwarding to a software layer for processing. The present disclosure is not intended to be limited to any particular frame detection methodology, control frame recognition strategy, or frame trapping mechanism.

Control frames may be associated with a timestamp as indicated at block 602. In some embodiments, timestamp values may be stored in hardware registers (e.g., flip-flops). Additionally, timestamp information collected in the hardware layer may be embedded into the frame itself, creating a modified control frame; this operation is depicted at block 603. In this context, a modified control frame represents the original control frame received by the switching device altered to include embedded timestamp information. As set forth above with reference to FIG. 5, various bits in tags or headers associated with a control frame may be set in accordance with timestamp information provided or identified by hardware. By way of example, timestamp information may be embedded into a frame using various bits in a MAC client data field; additionally or alternatively, some or all of the timestamp information may be embedded in a DSA Tag having an appropriately modified data structure.

A modified control frame may be forwarded to a software layer, e.g., via a CPU port at the switching device, for further processing (block 604). The operation depicted at block 604 may be enabled or facilitated by any of various trapping mechanisms or policy rules, and may be dependent upon, among other factors, the type or nature of the control frame received and identified at block 601 as well as the particular specifications associated with the communications protocol. As noted above, control software appropriately coded for operation in accordance with a particular protocol (e.g., PTP, SRP, or the like) may execute computations associated with synchronization and time base coordination.

In some embodiments, the hardware layer may optionally forward the original (i.e., unmodified) control frame to the software layer; this optional operation is depicted at block 605. In such embodiments, the software layer may acquire timestamp information either by extracting appropriate bits in the data fields associated with the modified control frame, by reading hardware registers, or both. It will be appreciated, however, that using timestamp information directly from the modified control frame may have efficiency advantages over obtaining that information from hardware registers.

As set forth above, control software may compute frequency and phase offset values representing differences between the BMC at the grand master node and the clocking mechanism employed at the switching device (block 606). These values, along with correction and residence times (block 607), may be computed as functions of the timestamp information associated with the control frame, either independently or in conjunction with various other data fields, for example as described in the IEEE 802.1AS standard and the IEEE 1588 standard.

A response frame or packet may be passed to the hardware layer as indicated at block 608. The information contained in the response frame may be protocol specific, for example, and may be generated to facilitate timing and synchronization between the switching device and the grand master node. Egress processing may begin as indicated at block 609.

Various embodiments can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the spirit and scope of the invention. Accordingly, other implementations are within the scope of the following claims.

What is claimed is:

1. An apparatus comprising:
   a plurality of interfaces to pass control frames;
   a memory to store configuration information;
   a select circuit to select one of the interfaces according to the configuration information; and
   a timing circuit to determine a time of passage of each control frame passing through the selected one of the interfaces,
   wherein the time of passage is one of a time of arrival of the control frame at the selected one of the interfaces and a time of departure of the control frame from the selected one of the interfaces, and
   wherein when the select circuit selects a different one of the interfaces, the timing circuit determines the time of passage of each control frame passing through the different selected one of the interfaces.

2. The apparatus of claim 1, further comprising:
   a processor to compute at least one of offset values, correction times, and residence times based on the time of passage of the respective control frame.

3. The apparatus of claim 2:
   wherein the apparatus generates a response frame for each control frame based on at least one of the respective offset values, correction times, and residence times.

4. The apparatus of claim 1, further comprising:
   a port comprising the interfaces.

5. The apparatus of claim 1, further comprising:
   a plurality of ports each comprising one of the interfaces.

6. The apparatus of claim 1, wherein each control frame comprises:
   a Precision Time Protocol (PTP) frame compliant with all or part of IEEE standard 1588 and/or 802.1AS.

7. The apparatus of claim 1, wherein each of the interfaces is selected from a group consisting of:
   a physical-layer device (PHY) interface;
   a media access control (MAC) interface;
   a gigabit media independent (GMII) interface; and
   a serializer/deserializer (SERDES) interface.

8. A network device comprising the apparatus of claim 1.

9. The network device of claim 8, wherein the network device is selected from the group consisting of:
   a network switch;
   a router; and
   a network interface controller.

10. A method comprising:
    passing control frames through a plurality of interfaces;
    storing configuration information;
    selecting one of the interfaces according to the configuration information;
    determining a time of passage, using a timing circuit, of each control frame passing through the selected one of the interfaces, wherein the time of passage is one of a time of arrival of the control frame at the selected one of the interfaces and a time of departure of the control frame from the selected one of the interfaces;
    selecting a different one of the interfaces; and
    determining the time of passage, using the timing circuit, of each control frame passing through the different selected one of the interfaces.

11. The method of claim 10, further comprising:
    computing at least one of offset values, correction times, and residence times based on the time of passage of the respective control frame.

12. The method of claim 11, further comprising:
    generating a response frame for each control frame based on at least one of the respective offset values, correction times, and residence times.

13. The method of claim 10, wherein each control frame comprises:
    a Precision Time Protocol (PTP) frame compliant with all or part of IEEE standard 1588 and/or 802.1AS.

14. The method of claim 10, wherein each of the interfaces is selected from a group consisting of:
  a physical-layer device (PHY) interface;
  a media access control (MAC) interface;
  a gigabit media independent (GMII) interface; and
  a serializer/deserializer (SERDES) interface.

* * * * *